(12) United States Patent
Simon et al.

(10) Patent No.: US 6,173,090 B1
(45) Date of Patent: Jan. 9, 2001

(54) APPARATUS FOR INGRESS AND EGRESS OF FIBER OPTIC SENSOR LEADS FROM THE SURFACE OF COMPOSITE PARTS AND A METHOD FOR THE MANUFACTURE THEREOF

(75) Inventors: Wayne R. Simon, Baltimore; William R. Pogue, III, Gambills, both of MD (US)

(73) Assignee: The United States of America as represented by the Secretary of the Navy, Washington, DC (US)

( * ) Notice: Under 35 U.S.C. 154(b), the term of this patent shall be extended for 0 days.

(21) Appl. No.: 09/246,175

(22) Filed: Oct. 29, 1998

(51) Int. Cl.[7] .................................. G02B 6/02; B32B 3/00
(52) U.S. Cl. .................. 385/12; 385/123; 428/411.1; 156/253
(58) Field of Search ..................................... 385/100, 123, 385/102–108, 12; 156/70, 252, 253, 260; 428/411.1–704

(56) References Cited

U.S. PATENT DOCUMENTS

| 4,848,869 | * | 7/1989 | Urruti | 350/96.33 |
| 5,399,854 | * | 3/1995 | Dunphy et al. | 250/227.17 |
| 5,604,836 | * | 2/1997 | Dunphy et al. | 385/138 |
| 5,733,043 | * | 3/1998 | Yamada et al. | 374/131 |
| 5,770,155 | * | 6/1998 | Dunphy et al. | 422/82.05 |

* cited by examiner

*Primary Examiner*—John D. Lee
*Assistant Examiner*—Sarah N Song
(74) *Attorney, Agent, or Firm*—John J. Karasek; Charlws J. Stockstill

(57) ABSTRACT

An apparatus for providing for the ingress/egress of an optical fiber in composite materials wherein flexible tooling protects the ingress and egress point of the optical fiber. The optical fiber is placed into the uncured laminates of the composite material prior to curing such laminates. The ingress/egress point of this fiber is protected from the laminates by enclosing the fiber with a plurality of polyimide and poly(tetrofluoroethylene) tubes. During the curing process, a rubber plate covers the laminates and the fiber optic lead are brought out of the laminates through a plug in the rubber plate and positioned along the rubber plate in grooves to protect the external fiber leads during curing. After curing a strain relief boot is placed over the fiber optic lead where it ingresses/egresses the composite material to relieve the strain generated on the optical fiber lead during operational use.

3 Claims, 8 Drawing Sheets

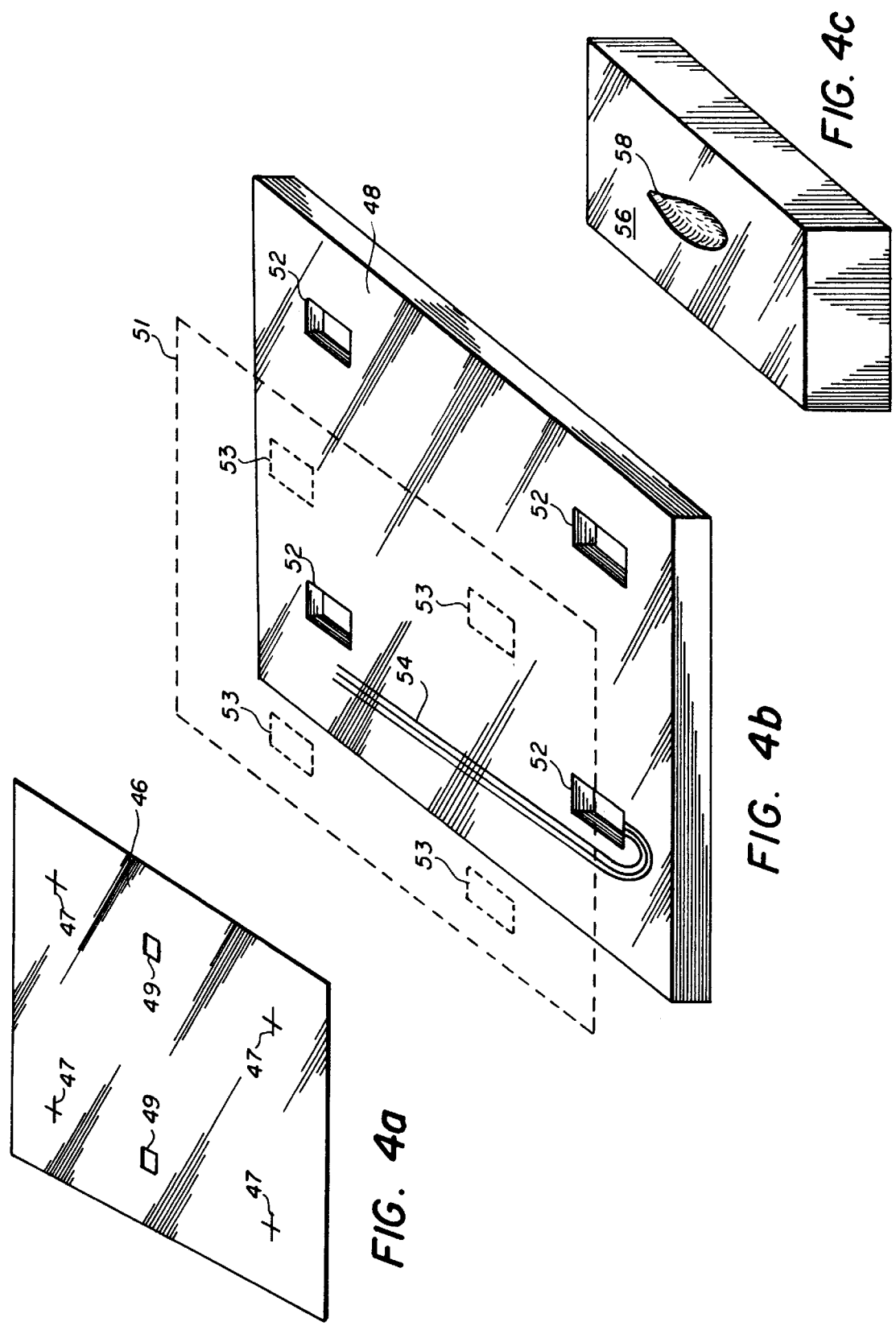

APPARATUS FOR INGRESS AND EGRESS OF FIBER OPTIC SENSOR LEADS FROM THE SURFACE OF COMPOSITE PARTS AND A METHOD FOR THE MANUFACTURE THEREOF

BACKGROUND OF THE INVENTION

1. Field of the Invention

This invention pertains generally to composite material and more specifically a technique for the ingress and egress of fiber optic sensor leads from the surface of composite materials.

2. Description of the Related Art

The purpose of embedding fiber optic sensors in materials is to accurately measure a specific material property at a specific location in the composite specimen. To accomplish this, the fiber optic sensor (FOS) must be placed precisely in the desired location (including depth or layer), and ingress of the optical fiber leads must be accomplished with a minimum of risk to the optical fiber and host composite part.

When a fiber optic sensor strand is embedded within a composite part, it is necessary to provide a lead through which the sensors can be interrogated. This lead extends out of the part, and must be of sufficient length and in good condition for cleaving and splicing operations to standard fiber optic connectors. The fiber lead is fragile, being made of glass, with a diameter, generally, of 125 microns (0.005 inches). This lead serves as the only link between the embedded sensors and the readout electronics, if the lead suffers damage then the sensors are lost, as they are irretrievably buried within a high strength composite component.

Cure process for many composite materials is an extremely harsh environment for the fiber optic sensor, and the sensor lead. Most high performance composites are consolidated under high pressure and temperature. Pressure is applied often through the use of a vacuum bag, hard tooling with an expanding mandrel, shrink tape, or a combination of the above. Failure of the lead can occur during the application of pressure due to pinching or kinking of the lead between parts of the tooling, due to relative motion of the parts of a given cure fixture. The lead does not have to break to fail; permanent sharp bends (kinks) in the fiber optic lead will render it useless as a waveguide. Likewise, subsequent post cure operations. such as disassembly of the curing fixture, are extremely hard on fiber optic sensor leads due to the tendency of the composite material to bleed or leak resin during the cure process.

Another less obvious mode of failure of the lead occurs when an improper tubing schedule is used to protect the leads at the ingress point. Without proper damming, resins will flow up the tubing during the cure cycle through capillary action. If the tubing is sufficiently oversized, air bubbles form within the tubing around the fiber optic cable. Upon later flexing of the lead the fiber optic cable can break at these bubbles, particularly if the tubing is made of such a material as Teflon®.

The last major mode of failure is breakage of the lead during handling and machining operations on the composite part. Leads which are not routinely armored and not sufficiently strain relieved will suffer damage under normal handling and machining operations.

The most widely used method for ingress and egress of the fiber optic leads are from the edge of a part. this method has been used successfully for test coupons but has limited practical applications because the edge of the coupon cannot be machined without chopping off the fiber optic cable in the process, or leaving an un-machined portion of material around the edge. Also, the fiber optic sensor lead is prone to breakage or severe kinking at the edge of the laminate during vacuum bagging as it is unsupported. Further, if the lead is supported to avoid the previously noted deficiency, then resin from the composite part often flows over the lead, which generally is spooled up at the edge of the laminate. This often causes fiber breakage during de-bagging or mold disassembly; the resin glues the fiber coil to itself and to parts of the mold or vacuum bag assembly. Interlaminar stress concentrations in composite parts becomes extremely large at the edge of a part. Test coupons exhibit this by edge delamination prior to failure. A discontinuity caused by a fiber optic cable at this area makes this condition worse as it acts as a stress riser or defect.

Egress from the surface of a part between layers of vacuum bagging materials has caused the following problems. The fiber left a deep imprint on the part surface, and thus created a defect and a possible failure initiation point. Resin flow into the vacuum bag material, i.e., breather (a material that resembles quilt batting) around the ingress-egress point creates a poor housekeeping condition, and the fiber optic cable must be carefully picked out of the resulting resin buildup. The fiber is unprotected from kinking at the egress point during vacuum bagging/mold assembly during this process. Egress points are unprotected after cure, no strain relief devise is used to protect the leads.

BRIEF SUMMARY OF THE INVENTION

The object of this invention is to provide an apparatus for installing fiber optic leads in a composite material so as to provide a rugged ingress/egress point for the fiber optic lead.

Another object of the invention is to provide an apparatus that allows for the installation of fiber optic cables in composite material without causing failure of the lead during the curing process through pinching due to pressure, kinking between parts of the tooling, or due to the relative motion of the parts in the cure fixture, and without causing failure of the fiber optic cables during removal of the finished part from the curing fixture.

These and other objectives are accomplished by utilizing flexible tooling and protecting the ingress/egress point of this fiber from the damage by enclosing the fiber with a plurality of polyimide and poly(tetrofluoroethylene) tubes so as to form a protected fiber optic lead. During the curing process, a rubber plate covers the surface of the laminate and the fiber optic leads are brought out of the laminates through a rubber plug in the rubber plate. The leads are then positioned along the rubber plate in grooves to protect the fiber lead during curing. After curing a strain relief boot is bonded over the fiber optic lead where it ingresses/egresses the composite material to protect the leads from damage during normal handling and use.

BRIEF DESCRIPTION OF THE DRAWINGS

FIG. 4a shows a template for the construction of a flexible rubber tool.

FIG. 4b shows a top view of a flexible rubber tool and flexible sheeting.

FIG. 4c shows a bottom view of a plug cut out from the flexible rubber tool with cavity.

DETAILED DESCRIPTION OF THE INVENTION

The device taught by this invention is for the ingress and egress of fiber optic sensor cables from the surface of composite parts while providing protection to the fiber optic cable during part fabrication, autoclave curing processes, and through subsequent handling and machining operations.

PREPARATION OF A FIBER OPTIC STRAND TO FORM A FIBER OPTIC LEAD

Figure 1:
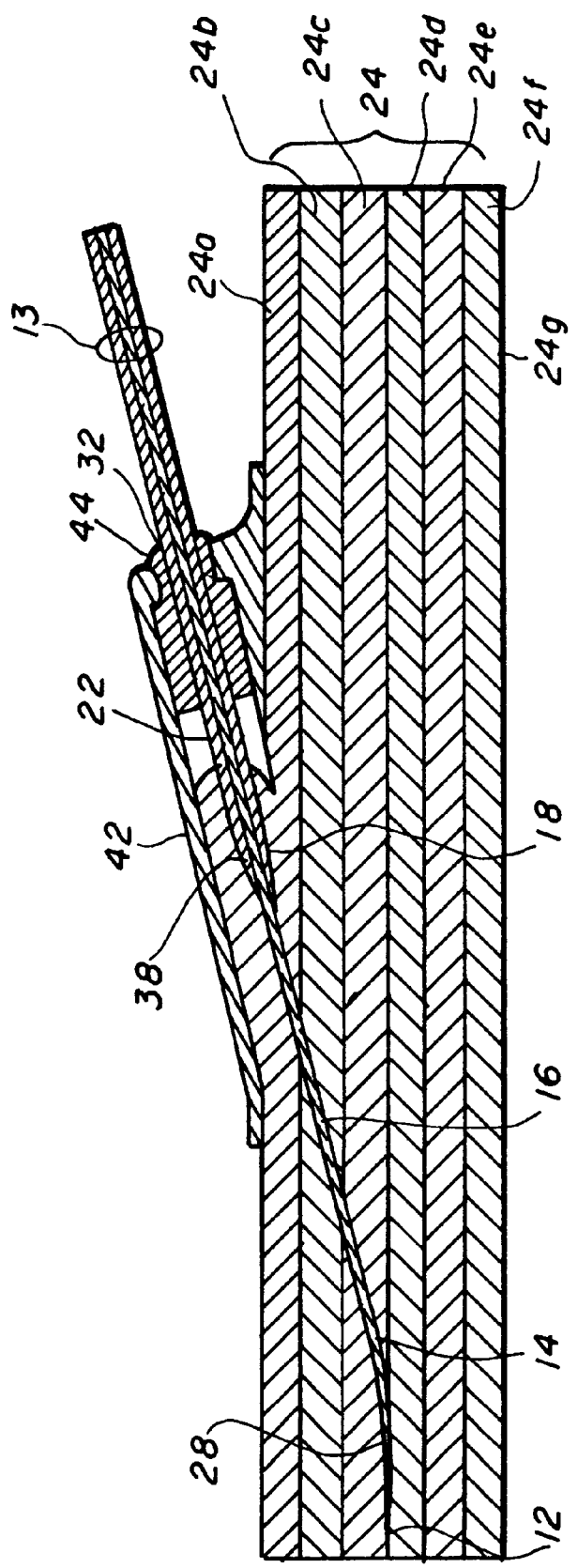
FIG. 1 shows a longitudinal cross-sectional view of the fiber optic lead ingress/egress device along the axis of the optical fiber.
Figure 2:
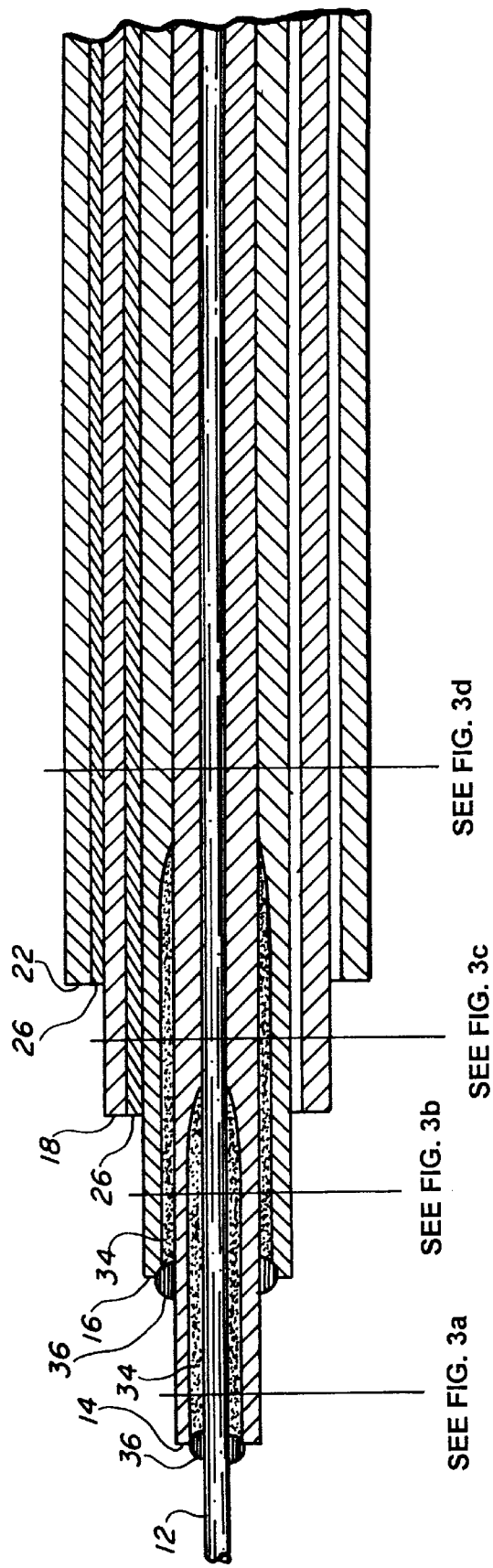
FIG. 2 shows a longitudinal cross-sectional view of a fiber optic cable with layers of protective tubing along the axis of the optical fiber.
Figure 3A:
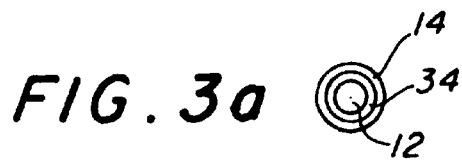
FIG. 3a shows a cross-sectional view of a fiber optic cable with one layer of protective tubing.
Figure 3B:
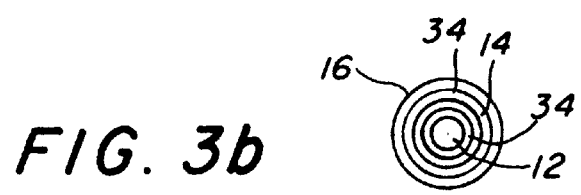
FIG. 3b shows a cross-sectional view of a fiber optic cable with two layers of protective tubing.
Figure 3C:
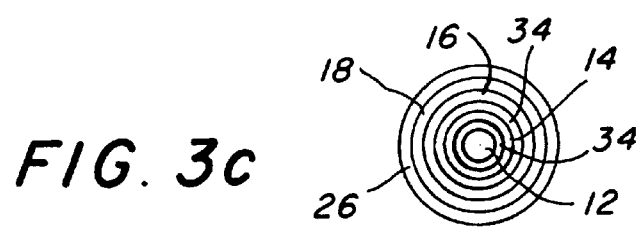
FIG. 3c shows a cross-sectional view of a fiber optic cable with three layers of protective tubing.
Figure 3D:
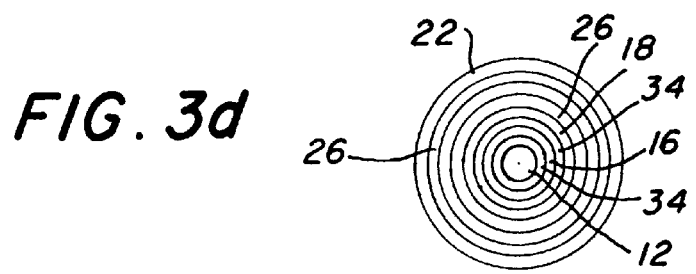
FIG. 3d shows a cross-sectional view of a fiber optic cable with four layers of protective tubing forming a fiber optic sensor lead.

In the preferred embodiment of the device 10, the first step is the preparation of a fiber optic sensor lead 13 by placing four layers of tubing 14–22 over the fiber optic sensor strand 12, as shown in FIG. 1. For a standard telecommunications grade optical fiber 0.005 inches in diameter, the preferable tubing layers 12–22 are (1) a 0.012 to 0.007 inch interior dimension (ID) polyimide tubing having a 0.001 to 0.0017 inch wall thickness 14, (2) a 0.014 to 0.009 inch ID polyimide tubing having a 0.001 to 0.0017 inch wall thickness 16, (3) a 39 Gage poly (tetrofluoroethylene) (Teflon®) heat shrink tubing, or 30 Gage dual heat shrink tubing 18, and (4) a 28–30 Gage thin wall poly(tetrofluoroethylene) (Teflon®) tubing 22. The tubing 14–22 is applied in a step fashion, as shown in FIG. 2 and FIGS. 3a through 3d, with the innermost polyimide tubing 14 extending for approximately 0.75 inches within the laminates 24a through 24g of composite material 24. The second layer of polyimide tubing 16 extending approximately 0.5 inches within the laminates 24a–g, and the Teflon® tubing 18 and 22 flush or approximately 0.1 inches within the laminates 24a–g. A damming material 26, such as General Electric RTV 30, RTV 61, or strain gage cement made by Micromeasurements Group, Inc., is applied between the layers of tubing 16 and 18, and layers 18 and 22 to prevent capillary resin flow up the tubing surrounding the fiber optic cable 12 and layered tubing 14–22 forming the fiber optic lead 13. Damming normally is not performed between the fiber optic cable 12 and polyimide tubing 14 and between the polyimide tubing 14 and 16 because resin 34 flow during the composite material 24 curing process up these tight fitting tubes 14–16 is beneficial to the strength of the fiber optic lead 13 after the composite material 24 cure. However, some low viscosity resin systems may require damming of the polyimide due to the high flow characteristics. The polyimide tubing 14 and 16 must be tacked 36 to the fiber optic 13 at the far end 28 away from the egress point 32 to prevent slippage using strain gage cement or five minute epoxy by Duro Corp.

The innermost layers of polyimide tubing 14 and 16 prevent the fiber lead 13 from kinking as it traverses the ply 24a–24g in the composite material 24 and protects it from breakage during the threading operation. Epoxy and cyanate ester resins, such as 954-2A by Hexcell Corp., bond well to polyimide tubing, and thus anchors it within the laminates 24a–g after cure. The first layer of Teflon® tubing 18 provides the lead 13 with structural strength, protection from damage at the surface of the part, and prevents resins from adhering the lead 13 to the molds (not shown) or other materials. The purpose of the final layer 22 is to provide protection from inadvertent resin flow from the composite laminates 24a–24g and other materials. The final thin wall of outermost Teflon® tubing 22 provides extra protection, and is expendable. The last layer 22 provides protection from inadvertent resin flow from the composite material 24; after cure it is readily stripped off the lead 26 along with any debris that happens to adhere to it.

PREPARATION OF A TOOL FOR EMBEDDING A FIBER OPTIC CABLE IN A FIBER REINFORCED COMPOSITE PART

Figure 4D:
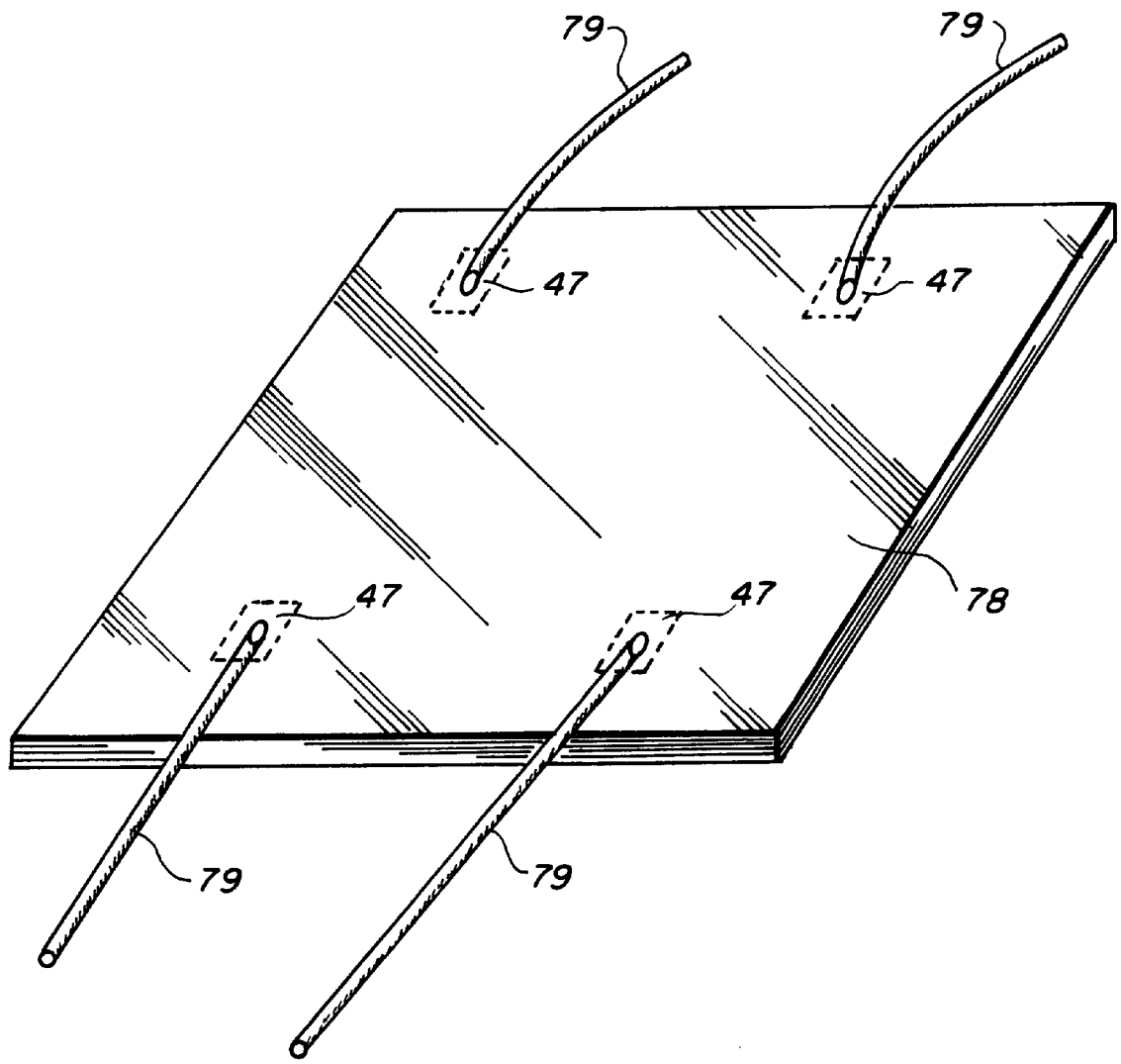
FIG. 4d shows a metal pattern to make a flexible rubber tool.
Figure 5A:
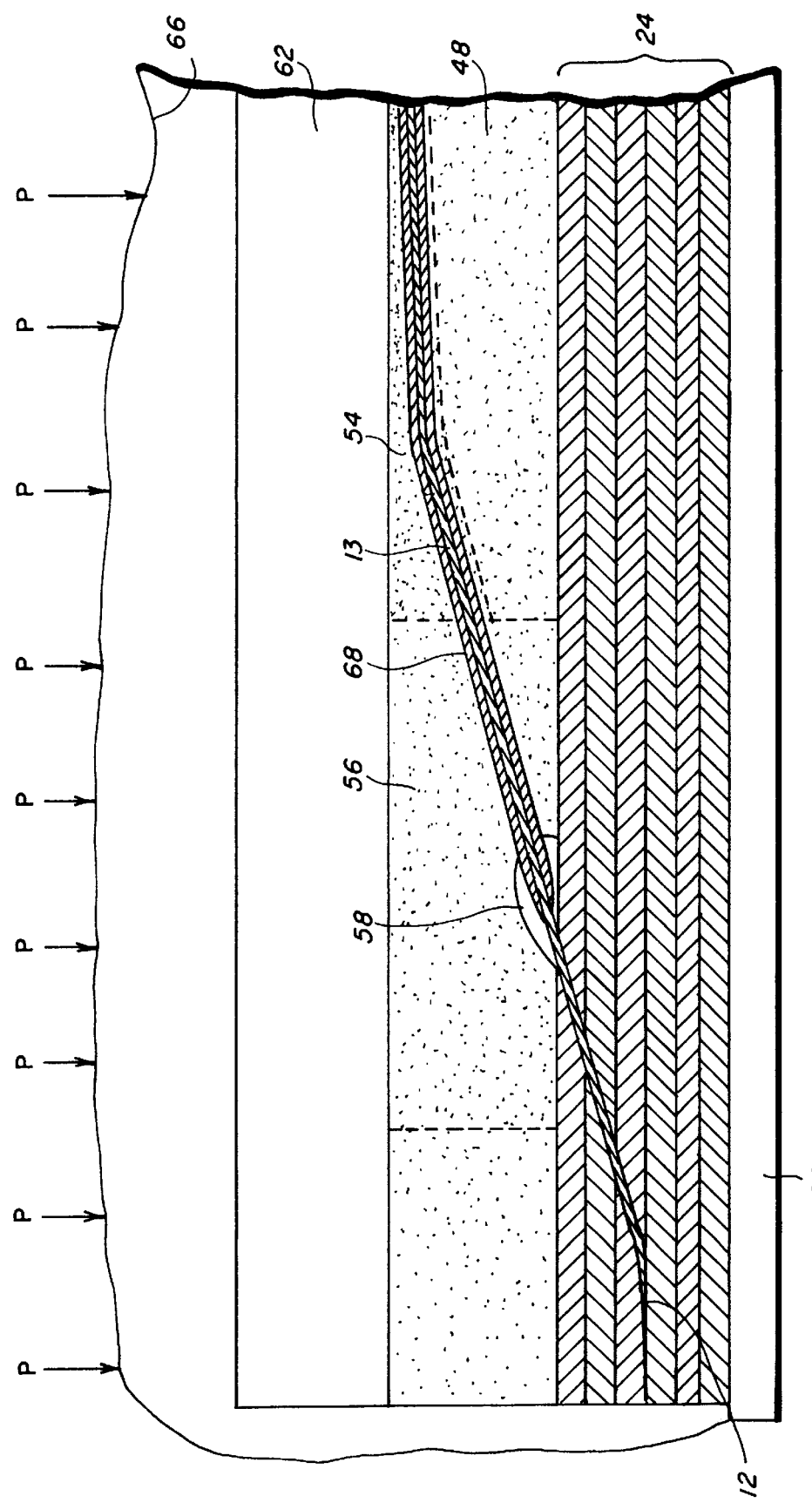
FIG. 5a shows a cross-sectional view of a composite structure with the ingress/egress device and optical fiber lead installed with the flexible rubber tool prepared for compression and curing.
Figure 5B:
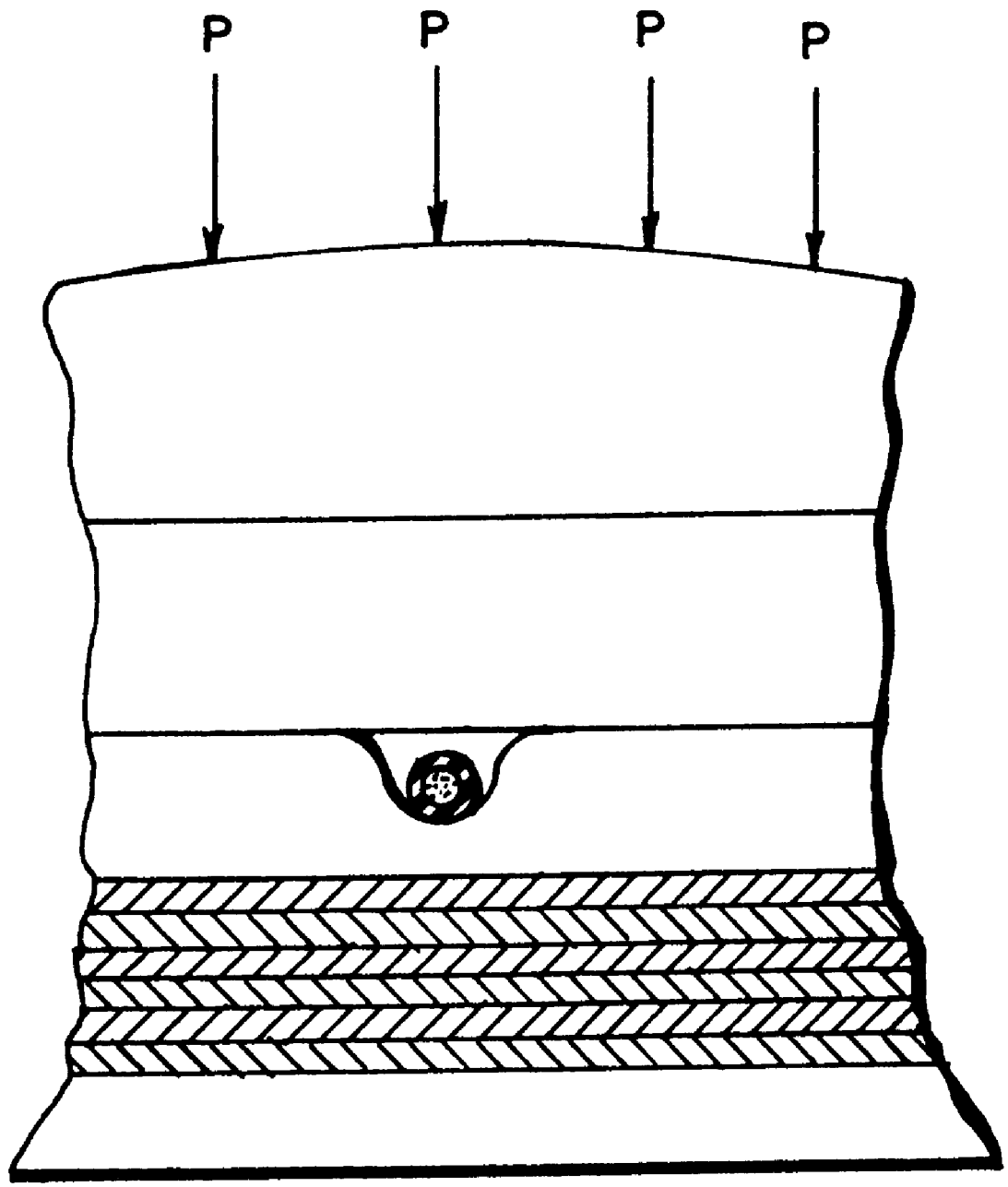
FIG. 5b shows a groove in the flexible rubber tool into which the optical fiber lead is placed during the pressurization and curing process.

The second step in constructing the preferred embodiment of the device 10 is to prepare a flexible tool 51, a top view of which is shown in FIG. 4b, for illustrative purposes the flexible tool 51 may described as for a flat plate. The techniques described here may be applied to complex parts and can be modified for hard tooling. A Mylar ® template 78, as shown in FIG. 4a, which delineates the path of the fiber optic sensor strand 12 through the laminate 24, is plotted full scale. Ingress and egress points 47 are clearly marked, as are the sensor 49 locations and areas to be avoided because of future machining operations. The first step is to construct a pattern 79 for the fiber lead 13, and for the strain relief at the ingress point 47. These patterns are bonded to a flat metal tool 48, see FIG. 4d, which is marked according to the template 46 part. Next, flexible sheeting for a flexible tool 51 (reinforced room temperature vulcanizing material (RTV) sheeting is adequate to accomplish this requirement) is cut out to the size of the flexible rubber tool 48 to be fabricated. The sheeting for the flexible tool 48 should be approximately 0.250 inch thick and capable of withstanding elevated temperatures (above 350° F.), and may be made of any pourable mold material which is temperature resistant, such as RTV 60 made by General Electric Corp., or any pourable flexible material which has high temperature resistance and is compatible with the composite material 24 resin system. Square holes 52 are then cut in the flexible tool 48 around the ingress and egress points 47 of the leads 13 as indicated on the template 46. The flexible tool 48 sheeting is then placed over the top of the metal plate 78, as shown in FIG. 4b. Next, channels or grooves 54 are cut in the top surface of the flexible tool 48 material to a depth which will allow the tubing patterns 79, as shown in FIG. 4d, to lie flush with the surface of the tool material 48 (nominally 0.063 inches deep). Special attention is to be given to the prevention of sharp beds or kinks in the pattern. A compatible two part liquid RTV, such as RTV 60, is then mixed and poured into the square holes 52 and over the fiber lead patterns 79 taped into the cut groves 54. Excess is squeegeed away, the tool 48 is vacuum bagged 66 with a caul plate 62, as shown in FIG. 5a, and the two part RTV is allowed to cure. Once cured, the caul plate 62 is removed, and the square plugs 56 at the ingress points 52 are cut out with a scalpel, slit where the fiber lead 13 passes through the plug 56, and identified as to which part of the flexible tool 51 it is associated with. The fiber patterns are released from their filled grooves 54, leaving a tubular cavity of the exact diameter of the fiber sensor lead 13, as shown in FIG 5b. The rubber plugs 56 now contain the cavity for the strain relief 58, and a hollow tube which leads from the strain relief to the matching cavity on the surface tool 48. A similar process may be used to fabricate tooling utilizing flexible mold materials for fiber optic egress from a more complex part. Existing hard tools for close molded parts may be modified by adding a soft plug with a strain relief at the egress site.

PREPARATION OF THE LAMINATES FOR CURING AND IMPLANTATION OF A FIBER OPTIC LEAD

Referring again to FIG. 1, assume that the fiber optic sensor strand 12 is to be embedded at the mid-point of the composite material 24 laminates 24a–24g, with an equal number of composite plys on top and bottom. The top and bottom halves of the laminates 24a–24c and 24d–24g, respectfully, are laid up according to the overall ply schedule, and then the template 46 which delineates the path of the fiber optic sensor strand 12 through the laminate 24a–24c is placed over the "top" half of the laminate 24c, facing up. The laminates 24a–24c are then placed on top of the soft rubber tool 48 such that the square holes line up with the egress points 47, and against ply 24a. The laminates 24a–24c are taped to the tool 48 to prevent sliding. The laminates 24a–24c are then pierced at the egress points 47 with an awl of diameter 0.06 inches, and a small piece of Teflon® tubing 68 immediately inserted within the hole. (Laminates tend to "heal" due to the tackiness of the uncured resin.) The template 46 is then carefully cut along the intended fiber path so as to provide a profile of the sensor layout. The template 46 is then laid onto the composite material 24, and the sensor strands 12 are fed through the ingress points 47 and down through the square holes 52 in the tool 48. The polyimide tubing, which may be obtained through the Cole Parmer Corp., at the ingress points 47 are tacked into position by a small patch of film adhesive which is compatible with the composite resin system to ensure proper depth penetration within the laminate 24 of the polyimide coated section of the lead 13. The fiber optic sensors (not shown) are then positioned as indicated by the template 46. Complex sensor patterns may be require inking the path on the composite material 24 and may also require the use of a compatible film adhesive (unsupported) to tack the fiber optic sensor (not shown) into place. Once the sensors (not shown) have been placed and secured, the template 46 is removed, and the bottom half of the laminate 24d–24g is then placed over the sensors (not shown) and rolled or ironed into place. The finished laminates 24a–24g are then taped around the edges to the rubber tool 48 to prevent sliding, and the entire assembly is carefully turned over onto the cure plate 64.

The rubber plugs 56 are then installed at the egress points 47, 52, and the fiber optic cable leads 13 are gently pushed into the grooves 54 in the surface of the tool 48 Release film and then the caul plate 62 is placed on top of the tool 48, and the art to be bagged 66 for the autoclave process.

The tool 48 provides a strain relief cavity at the surface of the composite material 24. This is needed to strengthen the part in this area to prevent kinking of the fiber optic sensor lead 13 in this critical zone where it leaves the surface of the composite material 24. The strain relief area also relaxes the accuracy required for the location of the fiber lead 13 as it leaves the composite material 24; the fiber lead 13 may exit the composite material 24 surface anywhere within the strain relief area 58. The strain relief area 58 fills with resin that flows during the curing process.

The rubber tool 48 fully protects the fiber optic cable lead 13 during the cure process from pinching, kinking and breakage due to its soft nature. The tool 48 also provides an optimal straight protected trench for the entire length of the fiber optic lead 13. The rubber tool 48 fits snugly around the lead 13, thus protecting the lead 13 from excessive resin flow. Very little resin can become entrapped between the tool 48 and the fiber optic lead 13. What little that does is easily wiped off, or comes off with the sacrificial layer of Teflon® tubing.

The tool 48 protects the surface of the composite material 24 from lead "print through", a depressing of the outer layer of laminate 24a of the composite material 24 due to the presence of the lead 13, during cure. It presents both the composite material 24 surface and caul plate 62 with a uniformly flat surface.

Most fiber optic sensor leads 13 are broken during de-bagging operations/mold disassembly. This soft rubber tool 48 entirely envelops the lead 13, and the first item removed during the breakout are the rubber plugs 56 around the strain relief 58 (primary area of failure). There is little chance of damaging the lead 13 during disassembly due to the soft nature of the tool 48 and the lack of resin stuck to the leads 13. Furthermore, most epoxy resins will not bond to RTV, particularly when it has been treated with a release agent.

Most fiber optic sensor leads 13 are broken during de-bagging operations/mold disassembly. This soft rubber tool 48 entirely envelops the lead 13, and the first item removed during the breakout are the rubber plugs 56 around the strain relief 58 (primary area of failure). There is little chance of damaging the lead 13 during disassembly due to the soft nature of the tool 48 and the lack of resin stuck to the leads. Furthermore, most epoxy resins will not bond to RTV, particularly when it has been treated with a release agent.

STRAIN RELIEF BOOT

Figure 6A:
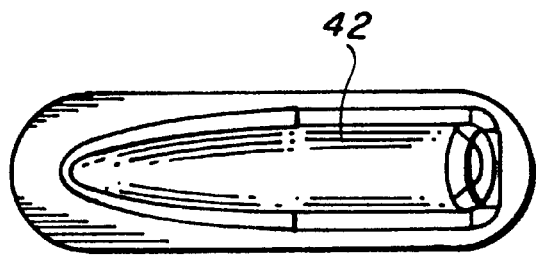
FIG. 6a shows a top view of a strain relief boot.
Figure 6B:
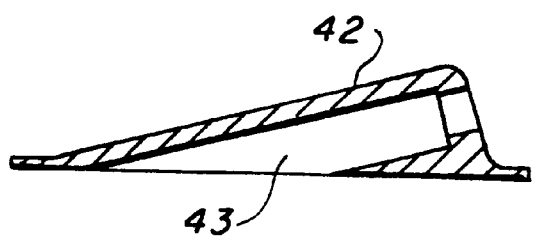
FIG. 6b shows a cross-sectional view of a strain relief boot.
Figure 6C:
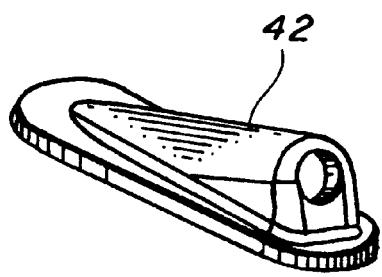
FIG. 6c shows a three-dimensional view of a strain relief boot.

The final step in the installation of the fiber optic leads 13 is the fabrication of a strain relief boot 42 to protect the lead egress point, and to armor the fiber optic lead 13. The boot 42, as shown in FIGS. 6a–6c, is cast with a two part aerospace epoxy, such as EA 9394 made by Dexter Hysol. The dimensions are roughly 1.0 inches by 0.5 inches in width, other applications could be ½ to ¼ this size. The strain relief boot 42 is cast in any material needed for the specific application in molds similar to those described herein. The boot 42 has an internal cavity 43 which is sized to fit over the egress strain relief nib 38 left on the surface of the tool 48 described above.

The tip of the boot 42 is designed to capture a cone shaped RTV plug (not shown), which is installed as a strain relief between the hard boot 42 and the fiber optic lead 13, if needed. This surface boot 42 device is used with the standard fiber optic armor, or any other protective tubing scheme as required. There should be at this stage a minimum of three layers of tubing on the fiber optic cable 12, two layers of polyimide, and on top of these a layer of Teflon®. Depending upon the final application, two or three more layers of heat shrink tubing my be added, or the boot 42 can be bonded over the existing tubing using a material such as TM BOND 2151 made by Dexter Lysol. More layers of tubing equals more protection from handling damage. When the lead 13 has been prepared with armor, the lead 13 is threaded through the boot 42, and the boot 42 is then slid into place and potted with an aerospace epoxy, such as TMBOND 2151 or EAQ309.3 made by Dexter Lysol, so that the boot 42 is bonded well to the surface of the composite material 24 and to the strain relief nub 58 created by the soft tool 48. This completes the embedding process.

Fiber optic sensors are in general very expensive, as are advance composite components. This surface ingress-egress embedding technique has a high survival rate for fragile optic sensors and leads. The surface mounted boot 42 and the molds to create it protect the egress 47 point of the fiber optic sensor lead 13. The boot 42 makes the egress point 47 rugged, i.e., able to withstand normal handling without damage. This surface boot 42 device may also be used with standard fiber optic armor, or any other protective tubing scheme as required.

The flexible tooling is reusable and several parts may be run off of the same tool. The tooling provides a strain relief cavity at the surface of the part. This is required to strengthen the part in this area, and to prevent kinking of the fiber optic sensor in this critical zone where it leaves the surface of the composite. The strain relief area also relaxes the accuracy required for the location of fiber leads as they leave the laminate, the fiber may exit the composite surface anywhere within the strain relief area. This strain relief area fills with resin that flows during the curing process.

What is claimed:

1. An apparatus for installing fiber optic strands in a composite material comprised of:
    a template outlining the locations where a plurality of optical fiber leads egress or ingress the composite material and the location of sensors within the composite material overlaying a flexible sheet;
    holes of a predetermined area cut in a flexible sheet at the location of the optical fiber leads points of ingress and egress the composite material;
    a flexible rubber plate with a portion of the rubber material removed at a point consistent with the holes in the flexible sheet and a portion of rubber material removed from the flexible rubber plate forming a groove;
    a flexible rubber plug conforming with the size of the portion of material removed from the flexible rubber plate placed in the hole in the flexible rubber plate;
    said rubber plug having a portion of rubber removed at the point on the plug where the template indicates a point of ingress or egress for a fiber optic lead;
    said flexible rubber plate placed over a plurality of uncured laminations of material to form the composite material so that the fiber optic leads extend through the portion of rubber removed from the plug and into the grooves in the flexible rubber plate;
    means for curing the laminates to form the composite structure; and
    a means for relieving a strain imposed on the fiber optic leads after the composite material has been cured.

2. A method for installing fiber optic strands in a composite material comprising the steps of:
    preparing a template outlining the locations where a plurality of optical fiber leads egress or ingress the composite material and the location of sensors within the composite material overlaying a flexible sheet;
    cutting holes of a predetermined area in a flexible sheet at the location of the optical fiber leads points of egress and ingress the composite material;
    removing a portion of a flexible rubber plate at a point consistent with the holes in the flexible sheet and removing a portion of rubber material forming a groove;
    cutting a flexible rubber plug conforming with the size of the portion of material removed from the flexible rubber plate and placing the rubber plug in the hole in the flexible rubber plate;
    removing a portion of the rubber plug at the point on the plug where the template indicates a point of ingress or egress for a fiber optic lead;
    placing said flexible rubber plate over a plurality of uncured laminations of material to form the composite material so that the fiber optic leads extend through the portion of rubber removed from the plug and into the grooves in the flexible rubber plate;
    curing the laminates to form the composite structure;
    removing the rubber plate from the cured laminates forming the composite material; and
    positioning a strain relief device over the fiber optic lead at the point of ingress or egress to relieve the strain imposed on the fiber optic leads in operational use.

3. A optical fiber lead comprised of:
    a single mode optical fiber strand;
    a first layer of loosely fitted polyimide tubing surrounding the optical fiber strand beginning at a predetermined point on the optical fiber strand;
    a second layer of loosely fitted polyimide tubing surrounding the first layer of polyimide tubing beginning a predetermined distance from the beginning of the first layer of polyimide tubing;
    a first layer of poly(tetrofluoroethylene) heat shrink tubing surrounding the second layer of polyimide tubing, beginning a predetermined distance from the beginning of the second layer of polyimide tubing, with a damming material between the first layer of poly(tetrofluoroethylene) tubing and the second layer of polyimide tubing;
    a second layer of thin wall poly(tetrofluoroethylene) tubing surrounding the first layer of poly(tetrofluoroethylene) tubing, beginning a predetermined distance from the beginning of the first layer of poly(tetrofluoroethylene) tubing, with a damming material between the first and second layers of poly(tetrofluoroethylene) tubing; and
    said layers of polyimide and poly(tetrofluoroethylene) tubing extending a predetermined length along the optical fiber strand.

* * * * *

UNITED STATES PATENT AND TRADEMARK OFFICE
CERTIFICATE OF CORRECTION

PATENT NO. : 6,173,090 B1
DATED : January 9, 2001
INVENTOR(S) : Wayne R. Simon, William R. Pogue, III It is certified that error appears in the above-identified patent and that said Letters Patent is hereby corrected as shown below:

<u>Title page,</u>
Item (74) Attorney, Agent, or Firm - : Delete Charlws J. Stockstill
               Insert Charles J. Stockstill Signed and Sealed this Twenty-eighth Day of August, 2001

*Attest:*

NICHOLAS P. GODICI
*Attesting Officer*   *Acting Director of the United States Patent and Trademark Office*